United States Patent [19]

Miyake

[11] Patent Number: 5,161,835
[45] Date of Patent: Nov. 10, 1992

[54] PIPE JOINT MECHANISM HAVING HIGH MAINTAINABILITY WITH WRAP-AROUND SEAL MEMBER

[75] Inventor: Yoshinori Miyake, 4-10, Kitahoncho 1-chome, Funabashi-shi, Chiba-ken 273, Japan

[73] Assignee: Yoshinori Miyake

[21] Appl. No.: 651,259

[22] PCT Filed: Jun. 25, 1990

[86] PCT No.: PCT/JP90/00818
§ 371 Date: Apr. 11, 1991
§ 102(e) Date: Apr. 11, 1991

[87] PCT Pub. No.: WO91/00471
PCT Pub. Date: Jan. 10, 1991

[30] Foreign Application Priority Data

Jun. 29, 1989 [JP] Japan .................................. 1-168168

[51] Int. Cl.⁵ .............................................. F16L 19/00
[52] U.S. Cl. ........................................ 285/322; 285/15; 285/341; 285/353; 285/384; 285/910; 277/198; 277/102

[58] Field of Search ............... 285/322, 353, 384, 385, 285/341, 336, 293, 910, 15, 16; 277/198, 102, 216, 204

[56] References Cited

U.S. PATENT DOCUMENTS

| | | | |
|---|---|---|---|
| 1,242,568 | 10/1917 | Loughridge | 285/384 |
| 2,554,585 | 1/1949 | Miller | 285/341 X |
| 3,375,025 | 3/1968 | Engel | 285/15 |
| 3,472,532 | 6/1967 | Leopold, Jr. et al. | 285/341 X |
| 3,653,691 | 4/1972 | Bram | 285/353 X |
| 3,689,110 | 9/1972 | Ferguson | 285/15 |
| 4,779,903 | 10/1988 | Maier et al. | 285/341 X |
| 4,836,583 | 6/1989 | Maier et al. | 285/341 X |

Primary Examiner—Randolph A. Reese
Assistant Examiner—Timothy Aberle
Attorney, Agent, or Firm—Birch, Stewart, Kolasch & Birch

[57] ABSTRACT

This invention relates to a joint mechanism of pipes having high maintainability for a pipeline disposed in a building or a buried object. An insertion member is interposed between the pipes or between the pipe and equipment to be connected and packing is applied over these three members. The packing is set and clamped by meshing of two screwed clamping rings.

8 Claims, 3 Drawing Sheets

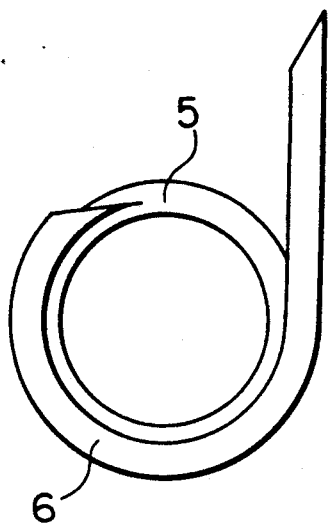
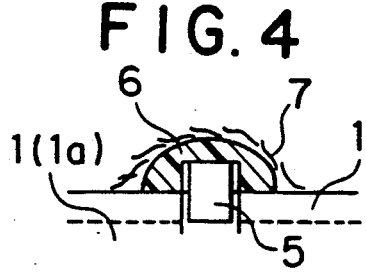
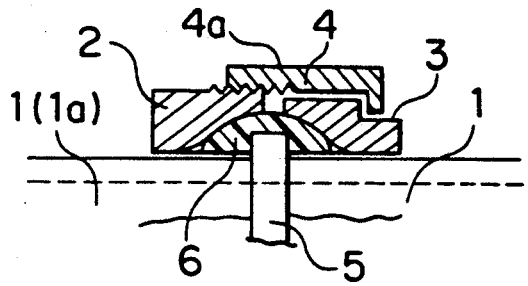
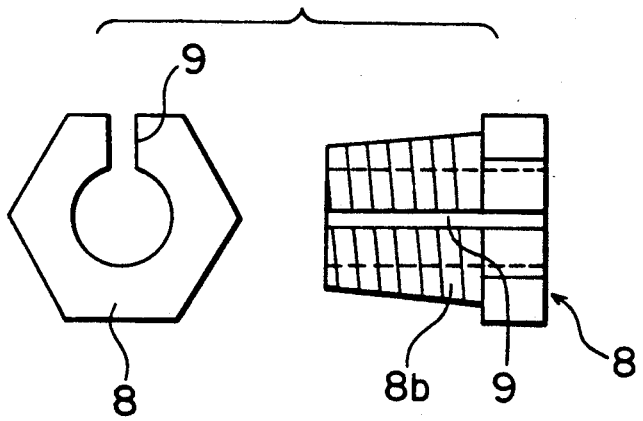
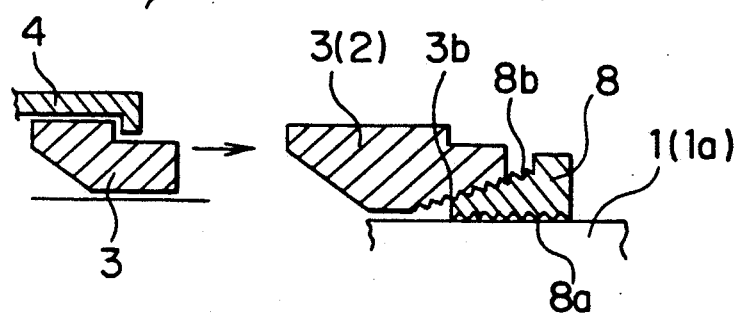

PIPE JOINT MECHANISM HAVING HIGH MAINTAINABILITY WITH WRAP-AROUND SEAL MEMBER

BACKGROUND OF THE INVENTION

1. Field of the Invention

This invention relates to a pipe joint mechanism for improved connection of branch pipes to, and fitting or replacement of valves and other equipment in a pipeline disposed in a building or in a soil layer, and is directed to provide a joint which facilitates and simplifies work required when part of an existing pipeline is connected to another pipe for partial repair or the like or when a valve, a meter or a flange is fitted to the pipeline or replaced.

2. Description of Related Art

Various joints have been proposed and put to practical use in the past which have been employed for partial improvement to, connection of branch pipe to and fitting or replacement of equipment such as a valve in a pipeline. Typical examples of such conventional joints employed for such purposes are illustrated in FIGS. 8 through 11 of the accompanying drawings.

In the joint shown in FIG. 8, a packing 22 is interposed between joint members 20 and 20 each having a screw portion 21 for meshing with a main pipe that forms a pipeline and a connecting ring 23 is anchored to a step portion 24 of one of the members 20 and is meshed at 25 with the other member 20.

In the joint shown in FIG. 9, ring-like grooves 32, 32 engaging with a ring chip 29 and a fitting confirmation line 33 are formed on a main pipe 26, a ring packing 31, a movable ring 30 and the ring chip 29 are sandwiched between a nut 28 engaging with a female screw portion of a main body 27 and the main body 27. The insertion depth of the main pipe 26 is determined by the fitting confirmation line 33, the nut 28 is screwed in while the ring chip 29 and the ring-like grooves 32, 32 are being aligned to one another, the main pipe 26 is clamped and restricted by the ring chip 29 and seal is effected by the ring packing 31.

In the joint showing in FIG. 10, nut members 36, 36 are each fitted to either side of an intermediate member 35, a main pipe is inserted up to step portion 37, 37 formed in the intermediate member 35 and after a packing is interposed, each nut member 36 is screwed so as to attain a seal on the outer surface of the main pipe by the packing.

In the joint shown in FIG. 11, a nut member 43 is set over two joint members 42, 42 interposing a seal member 41 such as an O-ring between their joint surface or in other words, the nut member 43 is anchored to an anchor step 45 formed on one (42) of the joint members and screwed to the other joint member 42. The main pipe to be connected is inserted into a fitting portion 44 in both joint members 42 and is welded around its entire periphery at the end portions 46 of the joint members 42.

In the conventional joints such as described above, however, their connecting works or operations are complicated and man-hours inevitably great.

In the joint shown in FIG. 8, a male screw must be threaded on the main pipe to be connected in order to screw-fit the joint member 20 to the screw portion 21 and in order to form such a male screw, the main pipe which has been laid down and kept under fixed state must be taken out over a considerable length or must be arranged so that a threading tool can be fitted to it and operated before the male screw is threaded. This means that a wall or soil layer must be broken to take out the main pipe or to establish the state where the threading tool can be fitted and operated, and the extent of the subsequent repair becomes essentially very great. Accordingly, many man-hours and quantities of materials are required for the repair.

In the joint shown in FIG. 9, too, the main pipe 26 must be taken out over a considerably great length so as to form the ring-like grooves 32, 32 meshing with the ring chip 29 and the fitting confirmation line 33. Therefore, the wall or soil layer must be broken over a considerably great range to take out the main pipe and the pipeline must then be repaired in the same way as the joint shown in FIG. 8.

In the joint shown in FIG. 10, a small diameter portion 38 which is in alignment with the inner diameter of the main pipe must be formed at the center portion of the intermediate member 35 so as to make the flow of a fluid from the main pipe smooth. Therefore, even if the end portion of one of the main pipes can be inserted by sliding the intermediate member 35, the other pipe cannot be inserted up to the step portion 37 because that main pipe is kept under the fixed state. Therefore, a large-scale moving operation is necessary for at least the other main pipe and many man-hours are inevitably required.

Since the joint shown in FIG. 11 includes two joint members 42, fixing by welding must be carried out carefully to assure water-tightness between these two joint members 42, 42 and the main pipe, respectively. Therefore, a space sufficient enough to operate a welding rod around the entire periphery of each portion and many man-hours are inevitably required.

SUMMARY OF THE INVENTION

The present invention provides a joint mechanisms of pipes characterized in that an insertion member having an outer diameter greater than that of a main pipe or a tubular portion of equipment or a branch pipe is disposed between the main pipe and a new pipe to be connected or between the main pipe and said tubular portion or main pipe to be connected, a packing is applied over the insertion member and the main pipe or the tubular portion, and a first clamping ring having a male screw formed thereon and a second clamping ring engaging with a nut member having a female screw meshing with the male screw are set over and clamp the packing.

In the present invention, the insertion member between the main pipe and the tubular portion or the main pipe is interposed under the condition where the main pipe(s) or the tubular portion is kept fixed.

After the packing is applied over the main pipe, the insertion member and the tubular portion or a main pipe, the nut member anchored to the second clamping ring is engaged with the first clamping ring so as to fasten and suitably fix the packing to the main pipe or the tubular portion and the insertion member and sealing is thus made.

BRIEF DESCRIPTION OF DRAWINGS

FIG. 3 is an explanatory view of a winding operation of the packing to an insertion member;

FIG. 4 is a partial sectional view of the insertion member under the wound state;

FIG. 5 is a sectional view showing the assembly state of a mechanism of the present invention;

FIG. 6 is an edge view and a side view of a wedge-shaped nut in another embodiment of the present invention;

FIG. 7 is a sectional view showing the assembly state between a main pipe or a tubular member and a clamping ring.

Figure 1:
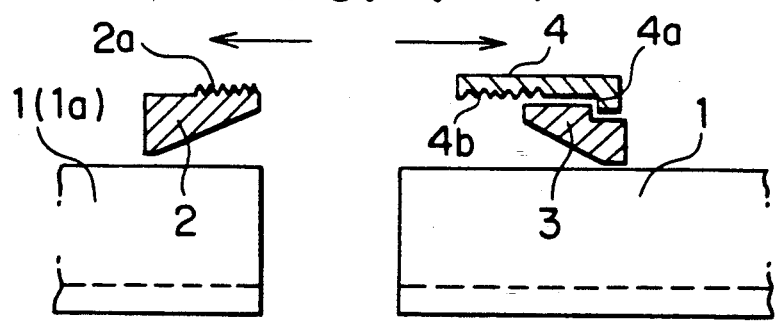
FIGS. 1(A) and 1(B) are an explanatory view showing step-wise the assembly state in an embodiment of the present invention.
Figure 1:
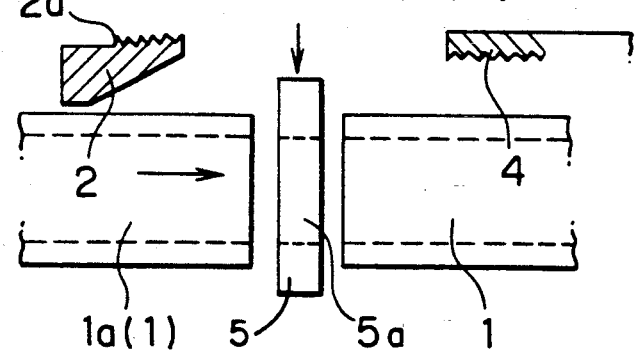

In these drawings, reference numeral 1 represents a main pipe; 1a is a new pipe or a tubular portion for equipment or the like; 2 is a clamping ring; 2a is its male screw; 3 is a clamping ring; 4 is a nut member; 4a is its female screw; 5 is an insertion member; 6 is a packing; 6a is its groove portion; 7 is a seal tape; 8 is a wedge-shaped nut; 8a is its female screw; 8b is its male screw; and 9 is its notch portion.

DETAILED DESCRIPTION OF PREFERRED EMBODIMENTS

The present invention will be described in further detail with reference to the accompanying drawings.

Figure 2:
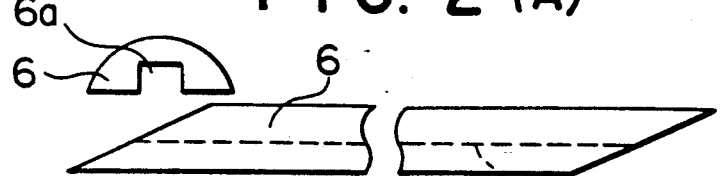
FIG. 2(A) is a side view and a sectional view of a packing used in the present invention
FIG. 2(B) is a plan view of the packing shown in FIG. 2(A)
FIG. 2(C) is a bottom view of the packing shown in FIG. 2(A)
Figure 2:
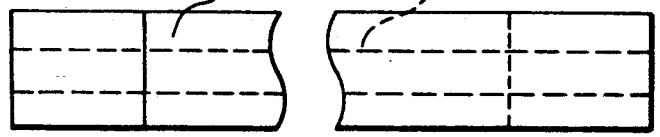
Figure 2:
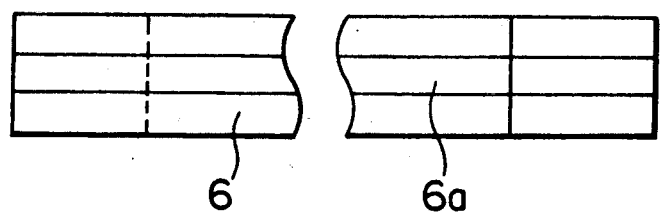
Figure 8:
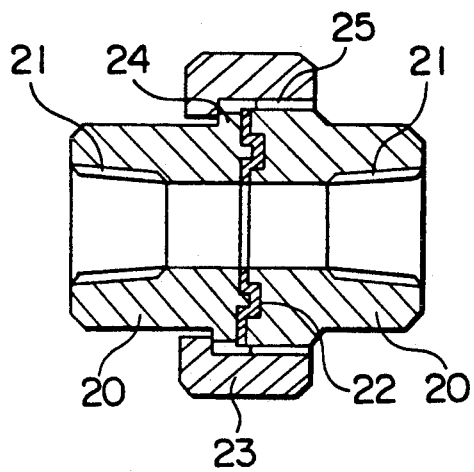
FIGS. 8 through 11 are sectional views of conventional joint mechanism, respectively.
Figure 9:
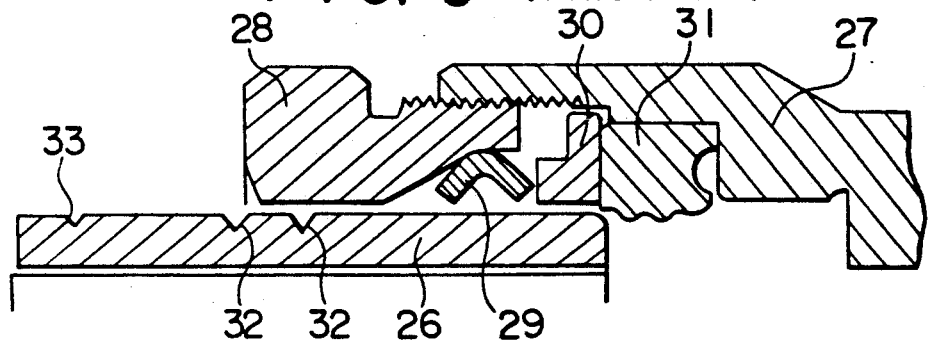
Figure 10:
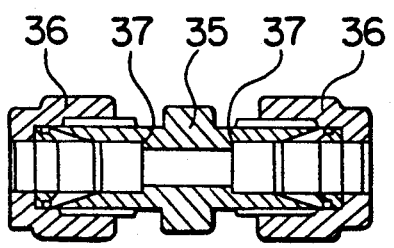
Figure 11:
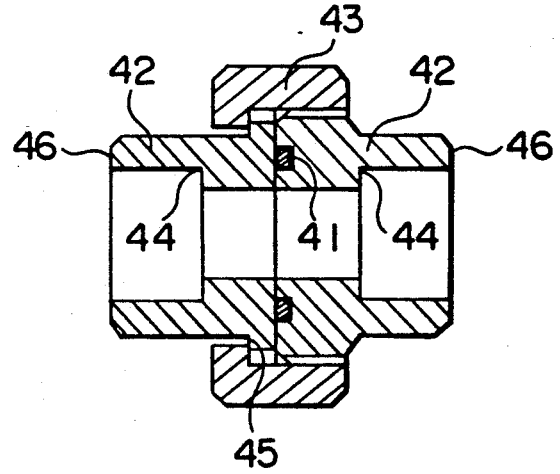

As shown in FIG. 1, the main pipes 1 and 1 or the main pipe 1 and a tubular portion 1a which is inserted anew are connected to each other by use of the first clamping ring 2 having the male screw 2a formed thereon, the second clamping ring 3 engaging with the nut member 4 having the female screw 4a which meshes with the male screw 2a and moreover, the insertion member 5 which is to be inserted between the main pipes 1 and 1 or between the main pipe 1 and a tubular portion including the end portion of equipment such as a valve inserted anew and which has an outer diameter greater than that of the pipes 1, 1 or that of the tubular member 1a and, as shown in FIGS. 2 and 3, by use of a packing 6 equipped with a groove portion 6a for accommodating the insertion member 5 at its intermediate portion. Furthermore, seal tape 7 or the like is also used, whenever necessary, and the members described above are clamped as shown in FIG. 5.

Namely, while the first and second clamping rings 2, 3 and the nut member 4 are fitted to the outside of the pipes 1, 1 or the pipe 1 and the tubular portion 1a as shown in FIG. 1(A), the insertion member 5 is positioned between the end surfaces of the pipes 1 and 1 or between the end surfaces of the pipe 1 and tubular portion 1a as shown in FIG. 1(B). A ring-like member having an inner hole 5a is used for the insertion members 5 when the fluid is caused to flow after the connection is completed but a blank sheet-like member is used when the passage of the fluid is stopped after the connection. (Such a case occurs frequently on the site.)

After the insertion member 5 is assembled in the manner described above, the packing 6 such as the one shown in FIG. 2 is then wound on the insertion member 5 and between the end portions of the pipes 1, 1 (or 1, 1a, which will be hereinafter referred to merely as "1, 1"). A plane packing or a ring packing is used as the packing 6. In the case of the plane packing, it is prepared in the form of a belt having a groove portion 6a at its middle portion. The end of this belt-like packing is cut in a predetermined length and in a taper form as shown in FIGS. 2(A) and 3 and a peripheral side of the insertion member 5 having a greater diameter than that of the pipes 1, 1 as described above is fitted and set to the groove portion 6a of the packing 6. Where the leak of the fluid is likely to occur from the tapered superposed portion of the plane packing, the packing in the ring-like form, or the ring packing, is employed, and its groove portion is fitted from the side portion of the insertion member 5. The seal tape 7 is further wound onto the outer surface of the packing 6 as shown in FIG. 4, whenever necessary. Under such a state, the female screw 4a of the nut member 4 is meshed with the male screw 2a of the first clamping ring 2 and both clamping rings 2 and 3 are fastened by the nut member 4. In other words the outer surface of the packing 6 or seal tape 7 is compressed on the joint surfaces of both clamping rings 2, 3 and connection is thus completed. The joint surface of both clamping rings 2, 3 is rounded appropriately so as to facilitate clamping and to attain stable fixing.

Although the joint mechanism of the present invention described above permits fundamentally extension and contraction of the main pipe to some extents, it tends to be insufficient to a tensile force. Therefore, when the joint mechanism is employed under the condition where the tensile force acts, a flexible tube (pipe) such as of a bellows type is used or alternatively, the wedge-shaped nut 8 such as shown in FIG. 6 is used. The flexible tube can be fitted to any known joint by shaping it as a fitting pipe. The wedge-shaped nut 8 is equipped with the female screw 8a in its inner hole into which the main pipe 1 or the tubular portion 1a is fitted and with the male screw 8b on its outer peripheral taper surface. Moreover, the notch portion 9 is formed at part of its outer periphery. The clamping ring 2 or 3 which mates with such a wedge-shaped nut 8 is equipped with the tapered female screw 2b or 3b engaging with the male screw 8b described above.

When the male screw 8b of the wedge-shaped nut 8 is meshed with the female screw 2b or 3b under the state where the joint mechanism of the present invention described above is set to a predetermined position, the wedge-shaped nut 8 itself is contracted within the range of its notch portion 9 and consequently, its female screw 8a comes into contact with the outer peripheral surface of the main pipe 1 or the tubular portion 1a and connects it fixedly.

In the present invention described above, when the joint mechanism is employed by cutting part of the main pipe 1 and using a new pipe as the tubular member 1 in the line of the main pipe 1 or when the equipment such as a valve or a branch pipe is disposed in the line of the main pipe 1, a pair of joint mechanisms of the present invention are assembled at both ends of the new pipe or between the end portions of the tubular portion 1a and the main pipe 1 on both sides of the equipment but the joint mechanism may be only one when the insertion member 5 as the blind cover is disposed in the main pipe 1 so as to stop flow of the fluid or when the insertion member 5 having the passage hole is disposed only for the hole made in part of the main pipe 1 or for any other hole portion.

Painting or planting for corrosion proofing is applied to the members of the joint mechanism of the present invention that are made of a steel material or other metals and painting or a member for preventing electrolytic corrosion is interposed at necessary portions. A suitable material such as a rubber material or resin material can be selected for the packing 6 described above in accordance with the kind of the fluid flowing through the pipe, its pressure conditions, and so forth. Typical examples of the materials are ethylene-propylene rubber, ethylene-propylene sponge, nitrilebutyl rubber (NBR), silicon rubber, Viton and Kalrez.

Industrial Applicability

In accordance with the present invention described above, connection can be made by merely interposing the insertion member between the end surfaces of the main pipe and the new pipe to be connected or between the end surfaces of the main pipe and the tubular portion of the equipment or branch pipe and then engaging the nut member anchored to one of the clamping rings with the other of the clamping rings. Accordingly, the intended work can be executed appropriately by destroying the wall surface or the soil layer of only the work portion in the line of the main pipe but does not need destruction and excavation for a broad range in the longitudinal direction of the line of the main pipe for the purpose of welding or screw-threading. Thus the overall quantity of execution works inclusive of the repair work after connection can be reduced remarkably and the execution works as well as the connection work can be carried out easily and smoothly. Accordingly, the present invention can conduct the connection works extremely advantageously in all the aspects of the execution time, labor and cost.

We claim:

1. A pipe joint mechanism for coupling opposing pipe sections comprising:
    an insertion member having a uniform width selected to substantially correspond to a distance between the opposing pipe sections and an outer diameter greater than the outer diameter of the opposing pipe sections, said insertion member being positioned between the opposing pipe sections;
    means for wrapping a packing member around the circumference of said insertion member and spanning said insertion member and at least a portion of the opposing pipe sections;
    a first clamping ring slidable over an exposed end of a first opposing pipe section, said first clamping ring having an inner inclined surface and including male threads formed around an exterior circumference thereof;
    a second clamping ring slidable over an exposed end of a second opposing pipe section, said second clamping ring having an inner inclined surface and including a notch formed around an exterior circumference thereof;
    a nut member around said second clamping ring, said nut member including a notch for engagement with the notch of said second clamping ring and including female threads formed on an inner periphery thereof for threadable connection with said male threads,
    wherein the connection of said nut member with said first connecting ring presses the inner inclined surfaces of said first and second connecting rings against said packing member and an outer circumference of said insertion member thereby providing a fluid-tight seal between said opposing pipe sections.

2. The pipe joint mechanism according to claim 1, further including a seal tape wrapped around and overlapping said packing member and the opposing pipe sections for increasing the effectiveness of the fluid-tight seal.

3. The pipe joint mechanism according to claim 1, wherein said insertion member includes an annular aperture corresponding in diameter to an inner diameter of said opposing pipe sections for allowing passage of fluid therebetween upon coupling of the opposing pipe sections.

4. The pipe joint mechanism according to claim 1, wherein said packing member is formed of a resilient material of a semicircle shape in cross section and including an inner groove corresponding in cross section to the outer diameter of said insertion member, whereby the connection presses the inner groove into a secured engagement with the outer periphery of said insertion member and distends the distal ends of the packing member into a secured engagement with the opposing pipe sections.

5. The pipe joint mechanism according to claim 4, wherein said resilient material is one of ethylene-propylene rubber, ethylene-propylene sponge, nitrilebutyl rubber and silicon rubber.

6. The pipe joint mechanism according to claim 4, wherein said resilient material is a rubber material.

7. The pipe joint mechanism according to claim 4, wherein said resilient material is a resin material.

8. The pipe joint mechanism according to claim 1, wherein said insertion member is a solid member to prevent passage of fluid between opposing pipe sections upon coupling thereof.

* * * * *